United States Patent Office 3,062,792
Patented Nov. 6, 1962

3,062,792
POLYMERS DERIVED FROM TETRAALKYL VINYLIDENEDIPHOSPHONATES
Richard L. McConnell and Harry W. Coover, Jr., Kingsport, Tenn., assignors to Eastman Kodak Company, Rochester, N.Y., a corporation of New Jersey
No Drawing. Filed Mar. 1, 1960, Ser. No. 11,990
6 Claims. (Cl. 260—85.5)

This invention relates to resinous, linear polymers of tetraalkyl vinylidenediphosphonates having the general structural formula:

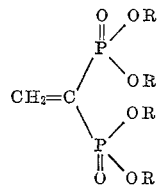

wherein R is an alkyl group of from 1–4 carbon atoms or a halogen substituted alkyl group of from 1–4 carbon atoms, e.g. methyl, ethyl, propyl, isopropyl, n-butyl, β-chloroethyl, β-chlorobutyl, etc. groups. The polymer products range from viscous and rubbery masses to clear, hard moldable materials. They are all soluble in one or more volatile solvents and mixtures thereof including acetone, methyl ethyl ketone, acetonitrile, methylene chloride, cyclohexanone, dimethylformamide, dimethylacetamide, etc. The polymer products are further characterized by being flame resistant.

It is, accordingly, an object of the invention to provide a new class of resinous, linear, fire-resistant polymers. Another object is to provide a process for preparing the new class of polymers. Other objects will become apparent hereinafter.

In accordance with the invention, we prepare our new polymer products by subjecting the above-defined tetraalkyl vinylidenediphosphonates alone or conjointly with each other or with one or more different kinds of monoethylenically unsaturated, polymerizable compounds containing a —CH=C< group, and more especially a $CH_2=C<$ group, to polymerizing conditions capable of producing resinous, linear, high-molecular weight polymers. However, we have found that while tetraalkyl vinylidenediphosphonates do not homopolymerize readily in the presence of peroxide catalysts, they can be easily copolymerized with typical vinylidene monomers coming within the above definitions such as styrene, vinyl esters of carboxylic acids, e.g. vinyl acetate, vinyl propionate, vinyl butyrate, vinyl benzoate, alkyl acrylates and methacrylates wherein the alkyl group contains in each instance from 1–4 carbon atoms, acrylonitrile, methacrylonitrile, vinyl chloride, vinyl fluoride, vinylidene chloride, etc., using conventional peroxide catalysts. The homopolymers may be successfully prepared by carrying out the homopolymerizations in the presence of metal alkyl catalysts such as lithium, sodium, potassium, magnesium, zinc or aluminum alkyls or by irradiation with a radioactive element.

For preparing the copolymers of the invention, different monomers can be polymerized in bulk (mass), in solvents or in heterogeneous dispersions where the mixture of monomers is dispersed in a non-solvent for the monomers, the particles of dispersed monomers being small (emulsion) or relatively large (bead or granular). In both bulk and solvent polymerizations, the organic peroxide catalysts are advantageously employed. These include benzoyl, acetyl, lauroyl, di-tert-butyl peroxide, etc. Water-soluble inorganic peroxides can also be used, e.g. hydrogen peroxide, ammonium persulfate, sodium persulate, potassium persulfate, persulfuric acid, sodium perborate, water-soluble salts of sulfo-per-acid (Caro's acid), and the like. The amount of catalyst employed can advantageously be from about 0.1 to 1% by weight of the monomers to be polymerized. Mixtures of these can be used, if desired. Suitable solvents include benzene, ethanol, acetone, acetonitrile and acetic acid.

For preparing the copolymers of the invention by emulsion polymerizations employing peroxide type catalysts, any non-solvent for the mixture of monomers can be employed, water being an especially advantageous medium. The monomers can be emulsified preferably in water using emulsifying agents such as salts of higher fatty acids, e.g. sodium or potassium stearate, palmitate, etc., or ordinary soaps, or salts of higher fatty alcohol sulfates, e.g. sodium or potassium lauryl sulfate, sodium or potassium di(2-ethylhexyl)sulfosuccinate, sodium or potassium cetyl sulfate, sodium or potassium stearyl sulfate, etc., salts of aromatic sulfonic acids, e.g. sodium or potassium salts of alkylnaphthalene sulfonic acids, and higher molecular weight quaternary ammonium salts, e.g. benzyldimethylphenyl ammonium chloride.

For bead or granular polymerizations, relatively poor dispersing agents such as starch, methylated starch, gum arabic, polyvinyl alcohol, partly hydrolyzed polyvinyl acetate, gelatin, sodium glycolate, etc. can be employed. Mixtures of these dispersing agents can also be used. In the above polymerization in which the monomers are dispersed in a non-solvent, the dispersion and polymerization can be facilitated by stirring, shaking, or tumbling the polymerization mixture. Heat accelerates all the polymerizations. The preferred temperature range is 20 to 125° C. Suitable reaction periods include 30 minutes to as much as several days. If desired, activating agents such as an alkali metal bisulfite, e.g. sodium or potassium bisulfite can be added in amounts of the same order as the peroxide catalyst. Also, chain regulators such as alkyl mercaptans can be added with advantage to the polymerization reaction mixtures. The proportions of the monomeric components to form the copolymeric products can vary over a wide range, but preferably any amount of the tetraalkyl vinylidenediphosphonate up to about 50% by weight of the mixture of monomers, and more advantageously from 5–50% by weight of the tetraalkyl vinylidenediphosphonates and from 95–50% by weight of the mentioned different kind of monoethylenically unsaturated, polymerizable compound. The proportion of monomers contained in the copolymers correspond, in general, to the proportions thereof in the starting monomer mixtures from which prepared.

For preparing the homopolymers of the invention employing metal alkyls as catalysts, we prefer to effect the polymerizations of the tetraalkyl vinylidenediphosphonates in dry hydrocarbon solvents using a 0.1 to 5.0% by weight concentration of the metal alkyl catalysts. The operable temperature range can vary from −70° to 200° C., but preferably from 0° to 100° C. Homopolymers may also be prepared by irradiating a sample of the tetraalkyl vinylidenediphosphonate with a radioactive material such as $Co^{60}$.

The tetraalkyl vinylidenediphosphonate monomers of the invention are prepared by the pyrolysis of the intermediate tetraalkyl 1-acetoxyalkylidenediphosphonates, the reaction being as indicated by the following equation:

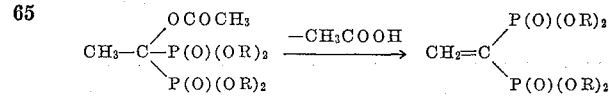

wherein R in each instance is as previously defined. The pyrolysis is advantageously carried out at temperatures ranging from about 450 to 500° C. The intermediate tetraalkyl 1-acetoxyalkylidenediphosphonates may be prepared as described by R. L. McConnell and H. W. Coover, Jr., in J. Am. Chem. Soc., 78, pages 4450-2 (1956).

The following examples will serve to illustrate further the manner of preparing and utilizing the polymers of the invention.

EXAMPLE 1

*Copolymer of Tetraethyl Vinylidenediphosphonate and Methyl Methacrylate*

Tetraethyl vinylidenediphosphonate (4.0 g.), methyl methacrylate (10.0 g.) and benzoyl peroxide (0.2 g.) were mixed and heated at 80 to 85° C. for a period of 24 hours. The product was a clear, hard moldable polymer having the composition of approximately 28% by weight of tetraethyl vinylidenediphosphonate combined linearly through the vinyl groups with approximately 72% by weight of methyl methacrylate. It was soluble in acetone.

EXAMPLE 2

*Copolymer of Tetrabutyl Vinylidenediphosphonate and Acrylonitrile*

Tetrabutyl vinylidenediphosphonate (2.0 g.), acrylonitrile (10.0 g.), ammonium persulfate (0.2 g.), sodium bisulfite (0.2 g.) and potassium laurate (2.0 g.) were added to 100 cc. of distilled water. Polymerization began immediately and was complete within 8 hours. The reaction mixture was tumbled during the polymerization. The polymer precipitated from solution and was isolated by filtration. After washing and drying, the product was a white powder which was soluble in dimethyl formamide and dimethyl acetamide. It consisted of approximately 16.7% by weight of tetrabutyl vinylidenediphosphonate combined linearly through the vinyl unsaturations with 83.3% by weight of acrylonitrile. It was particularly useful for the preparation of fibers and films having excellent physical properties.

EXAMPLE 3

*Copolymer of Tetraethyl Vinylidenediphosphonate and Vinyl Chloride*

Tetraethyl vinylidenediphosphonate (2.0 g.) and vinyl chloride (8.0 g.), ammonium persulfate (0.2 g.), sodium bisulfite (0.2 g.) and potassium laurate (2.0 g.) were added to 100 cc. of distilled water. The mixture was stirred into an emulsion and polymerized by heating at 35° C. to 45° C. for a period of 16 hours. The polymer which had formed was precipitated by adding a saturated aqueous solution of sodium chloride to the polymerization mixture. The polymer was filtered off, washed with water and dried. It was soluble in methyl ethyl ketone and cyclohexanone. Films and molded articles produced therewith by conventional means had good physical properties including toughness and flame resistance.

EXAMPLE 4

*Copolymer of Tetrakis(2-Ethylhexyl)Vinylidenediphosphonate and Styrene*

Tetrakis(2-ethylhexyl)vinylidenediphosphonate (1.0 g.), styrene (10.0 g.) and benzoyl peroxide (0.2 g.) were mixed and heated at 80° C. for 16 hours. A clear, moldable polymer was obtained. It was soluble in methylene chloride and acetone.

EXAMPLE 5

*Copolymer of Tetraethyl Vinylidenediphosphonate and Vinyl Acetate*

Tetraethyl vinylidenediphosphonate (5.0 g.), vinyl acetate (10.0 g.) and acetyl peroxide (0.3 g.) were placed in a sealed tube and heated at 100° C. for 36 hours. A clear, hard, and moldable resin, which gave tough and flame resistant shaped objects, was obtained. This polymer was soluble in acetone and in acetonitrile.

EXAMPLE 6

*Copolymer of Tetrakis(2-Chloroethyl)Vinylidenediphosphonate and Methacrylonitrile*

Tetrakis(2 - chloroethyl)vinylidenediphosphonate (3.0 g.) and methacrylonitrile (10.0 g.) were polymerized according to the procedure of Example 1 to produce a solid polymer.

EXAMPLE 7

*Homopolymer of Tetraethyl Vinylidenediphosphonate*

Tetraethyl vinylidenediphosphonate (20 g.) and dry heptane (25 cc.) were mixed and stirred while triethylaluminum (1.0 g.) dissolved in dry heptane (3 cc.) was added dropwise. The reaction vessel was kept under a blanket of nitrogen at all times. The polymerization is exothermic and the reaction mixture becomes viscous. After a short time, the reaction mixture separated into two layers. Then it was heated to reflux for three hours. After separating the polymer from the heptane, it was dried at 80° C. to remove any remaining solvent. The polymer obtained was a tough rubbery mass which was soluble in acetone. Transparent films were prepared by coating these acetone solutions or dopes on a glass plate. Tough rubbery buttons were obtained when the polymer was compression molded at 360° F. and 10,000 p.s.i.

Similar results were obtained when the catalyst used was triethylaluminum sesquibromide or lithium butyl. A polymer was also obtained when tetraethyl vinylidenediphosphonate (20 g.) in 100 ml. of dry mineral spirits was heated at 85° C. for four hours in the presence of a catalyst system consisting of triethyl aluminum (0.85 g.) and titanium trichloride (0.57 g.).

EXAMPLE 8

*Homopolymer of Tetramethyl Vinylidenediphosphonate*

Tetramethyl vinylidenediphosphonate was homopolymerized according to the procedure of Example 7 using dry benzene as the solvent and triethylaluminum sesquibromide as the catalyst. The polymer obtained had properties similar to those of the polymer described in Example 7.

EXAMPLE 9

*Homopolymer of Tetraethyl Vinylidenediphosphonate*

Tetraethyl vinylidenediphosphonate (10.0 g.) was sealed in a Pyrex glass tube under nitrogen and irradiated with 250,000 r./hr. for 96 hours using $Co^{60}$ as the source of radiation. The reaction product was a viscous mass. This was treated with methanol to wash out low molecular weight materials and the polymer was obtained as a white powder.

By proceeding as described above, other polymers coming within the invention and having generally similar properties and uses may be prepared. The copolymers are particularly useful and are preferred. As previously mentioned, they can be readily dissolved in one or more of the mentioned organic solvents to form clear and smooth dopes which can be extruded to filaments, coated to continuous sheets or applied as impregnating agents to paper and textile or fibrous materials. They are moldable with or without plasticizers, fillers, coloring matters, etc. by conventional extrusion or compression methods into shaped objects which are characterized by being tough and flame resistant. The sheet materials are especially useful as film supports for the preparation of light-sensitive photographic materials.

The invention has been described in detail with particular reference to preferred embodiments thereof, but it will be understood that variations and modifications can be effected within the spirit and scope of the invention as described hereinabove and as defined in the appended claims.

What we claim is:

1. A resinous linear polymer selected from the group consisting of (a) a homopolymer of a compound having the general formula:

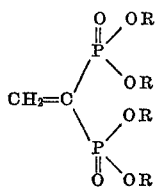

wherein in each instance R represents a member selected from the group consisting of an alkyl group containing from 1–4 carbon atoms and a monochloroalkyl group containing from 1–4 carbon atoms and (b) a copolymer of from 5–50% by weight of at least one compound represented by the said general formula and from 95–50% by weight of a monoethylenically unsaturated, polymerizable monomer selected from the group consisting of a vinyl ester of a saturated fatty acid containing from 1–4 carbon atoms, styrene, acrylonitrile, methacrylonitrile, vinyl chloride, vinylidene chloride, an alkyl acrylate and an alkyl methacrylate wherein in each instance the said alkyl group contains 1–4 carbon atoms.

2. A resinous linear copolymer of from 5–50% by weight of tetraethyl vinylidenediphosphonate and from 95–50% by weight of methyl methacrylate.

3. A resinous linear copolymer of from 5–50% by weight of tetrabutyl vinylidenediphosphonate and from 95–50% by weight of acrylonitrile.

4. A resinous linear copolymer of from 5–50% by weight of tetraethyl vinylidenediphosphonate and from 95–50% by weight of vinyl chloride.

5. A resinous linear copolymer of from 5–50% by weight of tetrakis(2-ethylhexyl) vinylidenediphosphonate and from 95–50% by weight of styrene.

6. Homopolymer of tetraethyl vinylidenediphosphonate.

References Cited in the file of this patent
UNITED STATES PATENTS

| | | |
|---|---|---|
| 2,719,143 | Van Dijk et al. | Sept. 27, 1955 |
| 2,854,434 | Beaman | Sept. 30, 1958 |